United States Patent
Hallas et al.

[15] 3,691,176
[45] Sept. 12, 1972

[54] 1-(4-FLUOROPHENOXYPROPYL)-4-ANILINO-PIPERIDINES

[72] Inventors: Robert Hallas, Waukegan; John Wayne Cole, Deerfield, both of Ill.

[73] Assignee: Abbott Laboratories, North Chicago, Ill.

[22] Filed: May 25, 1970

[21] Appl. No.: 40,376

[52] U.S. Cl...........260/293.79, 424/267, 260/612 D, 260/293.88
[51] Int. Cl. .............................................C07d 29/28
[58] Field of Search......................260/293.79, 293.83

[56] References Cited

UNITED STATES PATENTS 2,846,437 8/1958 Elpern......................424/267
3,161,637 12/1964 Janssen.................260/293.79

OTHER PUBLICATIONS

J. Pharm. Pharmac. 21:434– 37 (July 1969), Casy et al.

Primary Examiner—Henry R. Jiles
Assistant Examiner—S. D. Winters
Attorney—Robert L. Niblack

[57] ABSTRACT

A new series of piperidine derivatives has been discovered; they are the N-[3-(p-fluorophenoxy)propyl]piperidines carrying in the 4-position of the piperidine ring a substituted anilino group. These new compounds and their non-toxic acid addition salts are highly effective analgesics of low toxicity.

6 Claims, No Drawings

1-(4-FLUOROPHENOXYPROPYL)-4-ANILINO-PIPERIDINES

DETAILED DESCRIPTION OF THE INVENTION

The present invention is directed to 1,4-disubstituted piperidine derivatives of the formula

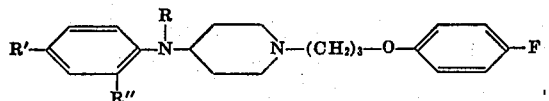

wherein R' is fluorine, chlorine or methoxy, R'' is hydrogen or methyl and R is hydrogen or methyl. The above compounds and their non-toxic acid addition salts show pronounced analgesic activity with oral $ED_{50}$ values between 10 and 25 mg./kg. while their toxicities show oral $LD_{50}$ values of 200 to 400 mg./kg. The therapeutic index values are generally between 10 and 25.

The new compounds of the present invention are made by simple and known procedural steps. In a general embodiment, the above three-ring containing compounds are prepared by condensing the piperidine moiety first with the properly substituted aniline derivatives and subsequently introducing the p-fluorophenoxypropyl chain. The compounds wherein R is methyl can be made from the corresponding three-ring compounds wherein R is hydrogen or, the methyl group can be introduced into the two-ring intermediate. The condensation for the two-ring intermediate is usually carried out by condensing 4-piperidone, carrying a protective group on the nitrogen, with the corresponding aniline, followed by reduction of the obtained Schiff base and cleavage of the protective group. As mentioned, the optional methyl group R can be introduced at this point, i.e., prior to the condensation which forms the three-ring unit.

The condensation of the 4-(substituted anilino)-piperidine is best carried out with 3-(p-fluorophenoxy)-1-bromopropane to produce the compound of the above structure. If R is methyl, said group can be introduced prior or following this condensation. In either case, the known reaction using formaldehyde and formic acid for the methylation is used.

A convenient form for administration of the above compounds to patients requiring treatment with analgesics is the oral route. For this route, the preferred component is a nontoxic acid addition salt of the above described three-unit compound, for instance, the hydrochloride, sulfate, phosphate, acetate, citrate, tartrate or succinate. These salts can easily be granulated and/or compounded into common dosage forms using the usual excipients, flavoring agents, fillers and the like often used in pharmaceutical tablets or suspensions. Other active components may be combined with the above active ingredients and the granules or tablets may be coated in usual fashion.

In order to illustrate the preparation of specific compounds of the present invention, reference is made to the following examples which, however, are not meant to limit the scope of this invention in any fashion. In all these examples, the compounds named were identified by chemical analysis, showing excellent agreement with their calculated formulas.

EXAMPLE 1

N-[3-(p-Fluorophenoxy)propyl]-4-(p-Fluoroanilino)piperidine Dihydrochloride a. 1-Carbethoxy-4-Piperidone A solution of 83.6 g. of 4,4-diethoxypiperidine and 60.6 g. of triethylamine dissolved in 500 ml. of ether was cooled in an ice bath to below 10°C. To this solution, 60.0 g. of ethyl chloroformate was added dropwise, keeping the temperature below 15°C. At the end of the addition, the reaction mixture was stirred at room temperature overnight. After this time, the reaction mixture was filtered to remove the triethylamine hydrochloride and the filter cake was washed with fresh ether. The filtrate was concentrated by heating on a steam bath. The residue was dissolved in 500 ml. of ethyl alcohol and this solution was diluted with 50 ml. of concentrated hydrochloric acid and 50 ml. of water. This solution was heated on a steam bath to reflux for five minutes and then concentrated in vacuo. The residue was dissolved in chloroform, the layers were separated and the organic layer was dried over magnesium sulfate, filtered and concentrated to leave a colorless oil which was purified by vacuum distillation; b.p. 100°/2mm; $N_D^{25°}$ 1.4716.

b. N-(1-Carbethoxy-4-Piperidylidene)-p-Fluoroaniline

A solution of 11.1 g. of p-fluoroaniline, 17.1 g. of 1-carbethoxy-4-piperidone, 500 mg. of p-toluenesulfonic acid hydrate in 250 ml. of toluene was heated to reflux and the water formed was collected by a Dean-Stark water separator. After refluxing for 24 hours, 1.9 ml. of water was collected (theory 1.8 ml.). The reaction mixture was washed with a 5 percent sodium bicarbonate solution. The layers were separated and the organic layer was dried over magnesium sulfate, filtered and concentrated to leave an oil. The oil was distilled by vacuum distillation. b.p. 158°/2mm; $N_D^{25°}$ 1.5325, and was obtained in a yield of 18 g.

c. 1-Carbethoxy-4-(p-Fluoroanilino)piperidine

A solution of 17.7 g. of N-(1-carbethoxy-4-piperidylidene)-p-fluoroaniline dissolved in 125 ml. of ethanol was hydrogenated at 3 atmospheres pressure in the presence of 3.5 g. 5 percent palladium on charcoal. When uptake was complete, the mixture was filtered and the catalyst was washed with fresh solvent. The filtrate was concentrated to leave an oil which crystallized. This product was purified by recrystallization from acetone-hexane and was obtained in a yield of 14.46 g. (81%); mp. 85°–6° C.

d. 4-(p-Fluoroanilino)piperidine

A suspension of 14.2 g. of 1-carbethoxy-4-(p-fluoroanilino)piperidine in 250 ml. of 6N HCl was heated to reflux for 24 hours. The resulting solution was concentrated to remove most of the solvent. The mixture was made basic with 50 percent aqueous sodium hydroxide while cooling in an ice bath. A solid separated and the aqueous layer was extracted with 3 portions of 250 ml. each of chloroform. The layers were separated and the organic layer was dried over $MgSO_4$, filtered and concentrated to leave a pale, yellow colored solid. Recrystallized from acetone-hexane yielded the pure compound melting at 112°–113°C.

e. N-[3-(p-Fluorophenoxy)propyl]-4-(p-Fluoroanilino)piperidine Dihydrochloride

A solution of 8.82 g. of 4-(p-fluoroanilino)piperidine, 10.9 g. of 3-(p-fluorophenoxy)-1-bromopropane, 7.8 g. of potassium iodide and 6.5 g. of potassium carbonate in 150 ml. of dimethylformamide was heated at 95°–100°C. for 20 hours. After this time, the reaction mixture was filtered to remove the inorganic salts and the filtrate was evaporated. The residue was dissolved in chloroform and the organic layer was washed with 300 ml. of cold water. The organic layer was dried over $MgSO_4$, filtered and concentrated to leave a reddish colored oil. The dihydrochloride was made by adding two equivalents of anhydrous hydrochloric acid in ethyl alcohol. The salt was isolated and recrystallized from ethyl alcohol to yield 15.39 g. of the new compound of formula $C_{20}H_{26}Cl_2F_2N_2O$; mp. 196°–200°C.

EXAMPLE 2

N-[3-(p-Fluorophenoxy)propyl]-4-(p-Fluoro-N-Methylanilino)-piperidine Dihydrochloride To a solution of 6.3 g. of N-[3-(p-fluorophenoxy)propyl]-4-(p-fluoroanilino)piperidine (see Example 1e) in 40 ml. of 90 percent aqueous formic acid was added 4.5 ml. of 37 percent aqueous formaldehyde. Carbon dioxide evolution was noticed. The solution was heated at 100°C. for 24 hours and subsequently diluted with 50 ml. of 10 percent aqueous hydrochloric acid. The mixture was then evaporated and the residue was dissolved in water. The aqueous solution was made alkaline by adding 50 percent aqueous sodium hydroxide under cooling and extracted with three 250 ml. portions of chloroform. The extracts were dried over $MgSO_4$, filtered and evaporated to leave an oil of the free base. The dihydrochloride was made as described in Example 1e and the obtained salt was purified by recrystallization from ethyl alcohol to produce the desired compound of formula $C_{21}H_{28}Cl_2F_2N_2O$ melting at 207°–10°C. (dec.)

EXAMPLE 3

N-[3-(p-Fluorophenoxy)propyl]-4-(p-Methoxyanilino)piperidine Dihydrochloride a. 4-(p-Methoxyanilino)piperidine A solution of 36.2 g. of 1-benzyl-4-(p-methoxyanilino)piperidine (C.A. 62, 14634 of 1965) in 250 ml. of ethanol was hydrogenated at 3 atmospheres in the presence of 5.2 g. of 5 percent palladium on charcoal till the uptake was complete (about 15 hours). The catalyst was filtered off and washed with ethanol. The combined wash liquor and filtrate was evaporated and the residual oil was purified by a vacuum distillation (175°C./B3mm), yielding 18.3 g. of the pure material melting at 70°–72°C.

b. N-[3-(p-Fluorophenoxy)propyl]-4-(p-Methoxyanilino)piperidine Dihydrochloride

A solution of 10.3 g. of 4-(p-methoxyanilino)piperidine, 11.65 g. of 3-(p-fluorophenoxy)-1-bromopropane, 7.4 g. of potassium carbonate and 8.8 g. of potassium iodide in 130 ml. of dimethylformamide was heated at 100°C. for 20 hours and worked up as in Example 1e. Recrystallization from ethyl alcohol yielded 12.94 g. of the new compound of formula $C_{21}H_{29}Cl_2FN_2O_2$ melting at 205°–209°C.

EXAMPLE 4

N-[3-(p-Fluorophenoxy)propyl]-4-(2-Methyl-4-Fluoroanilino)-piperidine Dihydrochloride a. N-(1-Carbethoxy-4-Piperidylidene)-2-Methyl-4-Fluoroaniline A solution 25.9 g. of 2-methyl-4-fluoroaniline, 36.0 g. of 1-carbethoxy-4-piperidone, and 500 mg. of p-toluenesulfonic acid hydrate in 400 ml. of toluene was refluxed for 24 hours and worked up as in Example 1b. The crude product was purified by a vacuum distillation (170°C./2mm) yielding 47.16 g.; $N_D^{25°}$ 1.5268.

b. 1-Carbethoxy-4-(2-Methyl-4-Fluoroanilino)piperidine

By following the process of Example 1c using the preceding compound as the starting material, 38.81 g. of 1-carbethoxy-4-(2-methyl-4-fluoroanilino)piperidine, melting at 104°–5°C. was obtained after recrystallization from acetone-hexane.

c. 4-(2-Methyl-4-Fluoroanilino)piperidine

This compound was obtained from the derivative described in (b) above by following the procedure of Example 1d. It is a liquid, boiling at 120°C./1mm; $N_D^{25°}$ 1.5500.

d. N-[3-(p-Fluorophenoxy)propyl]-4-(2-Methyl-4-Fluoroanilino)-piperidine Dihydrochloride A solution of 10.4 g. of 4-(2-methyl-4-fluoroanilino)-piperidine, 11.65 g. of 3-(p-fluorophenoxy)-1-bromopropane, 7.4 g. of potassium carbonate and 8.8 g. of potassium iodide in 130 ml. of dimethylformamide was heated at 95°–100° C. for 20 hours after which, the reaction mixture was worked up as in Example 1e. The crude product was recrystallized from ethyl alcohol, yielding 15.89 g. of the compound of formula $C_{21}H_{28}Cl_2F_2N_2O$, melting at 227°–230°C.

EXAMPLE 5

N-[3-(p-Fluorophenoxy)propyl]-4-(2-Methyl-4-Methoxyanilino)-piperidine Dihydrochloride a. N-(1-Benzyl-4-Piperidylidene)-2-Methyl-4-Methoxyaniline A solution of 27.4 of 2-methyl-4-methoxyaniline, 37.9 g. of 1-benzyl-4-piperidone and 500 mg. of p-toluenesulfonic acid hydrate in 400 ml. of toluene was treated and worked up as in Example 1b to produce a crude yield of 62.0 g. This material was used as it is without further purification.

b. 1-Benzyl-4-(2-Methyl-4-Methoxyanilino)piperidine

By following the procedure of Example 1c with 62.0 g. of the material from the preceding section, the desired compound of formula $C_{20}H_{26}N_2O$ was obtained. It was purified by recrystallization from acetone-hexane to yield 34.28 g. of the pure compound melting at 92°–3C.

c. 4-(2-Methyl-4-Methoxyanilino)piperidine

The product of Example 5b was debenzylated under the same conditions as used in Example 3a. The crude product was purified by vacuum distillation (b.p. 150°C/bimm) and 15.94 g. (75%) of the pure compound of formula $C_{12}H_{20}N_2O$ was obtained; $N_D^{25°}$ 1.5668.

d. N-[3-(p-Fluorophenoxy)propyl]-4-(2-Methyl-4-Methoxyanilino)-piperidine Dihydrochloride By following the procedure of Example 3 using 11.0 g. of 4-(2-methyl-4-methoxyanilino)piperidine and 11.65 g. of 3-(p-fluorophenoxy)-1-bromopropane, the desired compound of formula $C_{22}H_{31}Cl_2FN_2O_2$ was obtained in a yield of 13.4 g. after recrystallization from ethanol.

By subjecting the above compound to the procedure described in Example 2, the corresponding N-methyl compound, i.e., N-[3-(p-fluorophenoxy)propyl]-4-(2-methyl-4-methoxy-N-methylanilino)piperidine dihydrochloride of empirical formula $C_{23}H_{33}Cl_2FN_2O_2$ was obtained in a yield of 45.5 percent of theory.

EXAMPLE 6

N-[3-(p-Fluorophenoxy)propyl]-4-(p-Chloroanilino)piperidine a. N-(1-Carbethoxy-4-Piperidylidene)-p-Chloroaniline A solution of 12.7 g. of p-chloroaniline, 17.1 g. of carbethoxy-4-piperidone, and 500 mg. of p-toluenesulfonic acid hydrate in 200 ml. of toluene was treated and worked up as shown in Example 1b. A crude yield of 29 g. of the compound of formula $C_{14}H_{17}ClN_2O_2$ was obtained.

b. 1-Carbethoxy-4-(p-Chloroanilino)piperidine

A solution of 29 g. of the crude material of the preceding section in 250 ml. of ethyl alcohol was hydrogenated at 3 atmospheres pressure in the presence of 4.0 g. of 5 percent platinum on carbon. The reaction was run and worked up as in Example 1c. The product was purified by a recrystallization from acetone-hexane. Yield 14.01 g; mp. 114°–116°C.

c. 4-(p-Chloroanilino)piperidine 13.8 g. of 1-carbethoxy-4-(p-chloroanilino)piperidine was hydrolyzed and the product was isolated in the same manner as described in Example 1d. The product was recrystallized from acetone-hexane, yielding 8.18 g. of the pure compound of formula $C_{11}H_{15}ClN_2$, melting at 109°–11°C.

d. N-[3-(p-Fluorophenoxy)propyl]-4-(p-Chloroanilino)piperidine Dihydrochloride

By following the procedure of Example 1e but using the compound of Example 6 for the condensation with 3-(p-fluorophenoxy)-1-bromopropane, the desired compound of formula $C_{20}H_{26}Cl_3FN_2O$ was obtained in good yield.

EXAMPLE 7

To test the analgesic activity of the new compounds of the present invention, the method of Woolfe and MacDonald, Journal of Pharmacology and Exp. Therapy, Vol. 80, Page 300 (1944) was used. The compounds of the present invention all have low $ED_{50}$ values. Specifically, the compound of Example 1 was found to have an oral $ED_{50}$ of 15.6 mg./kg. and an oral $LD_{50}$ of 400 mg./kg. The corresponding values for the compounds of Example 2 are 23.3 and 300 mg./kg. respectively. The compound of Example 3 shows an oral $ED_{50}$ of 14.0 mg./kg. and an oral $LD_{50}$ of 300 mg./kg.

As mentioned above, and as demonstrated in Example 7, the oral toxicities are very low in view of the extremely low values for effective doses, with therapeutic index values between 10 and 15. The new compounds are particularly well suited for oral administration to warm-blooded animals. In lower animals, the dosage ranges from 1–10 mg./kg. while the recommended oral dose for a single administration to adult patients is between 6 and 30 mg.

The new compounds distinguish over older, known compounds in some specific characteristics which need to be present for the high activity and low toxicity shown above. These characteristics are the presence of three rings, the spacing of the phenoxy radical from the N-position of the piperidine through a propylene chain, the substitution with the anilino moiety in the 4-position of the piperidine ring without other linking atoms and the presence of negative substituents in the p-positions of both phenyl rings. The anilino-nitrogen may carry a methyl group but other substituents tend to reduce the favorable therapeutic index.

We claim:

1. A compound of the formula

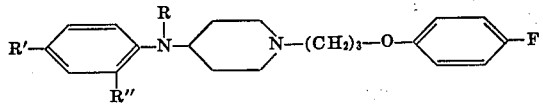

wherein R is hydrogen or methyl, R' is fluorine, chlorine or methoxy, R'' is hydrogen or methyl or a non-toxic acid addition salt thereof.

2. The compound of claim 1 wherein R and R'' are hydrogen and R' is fluorine.

3. The compound of claim 1 wherein R and R'' are hydrogen and R' is methoxy.

4. The compound of claim 1 wherein R is hydrogen, R' is fluorine and R'' is methyl.

5. The compound of claim 1 wherein R is methyl, R' is fluorine and R'' is hydrogen.

6. The compound of claim 1 wherein R' is methoxy, R'' is methyl and R is hydrogen.

* * * * *